(12) United States Patent
Chou

(10) Patent No.: US 7,782,556 B2
(45) Date of Patent: Aug. 24, 2010

(54) LENS ACTUATOR

(75) Inventor: Tai-Hsu Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 157 days.

(21) Appl. No.: 12/236,002

(22) Filed: Sep. 23, 2008

(65) Prior Publication Data

US 2009/0290233 A1    Nov. 26, 2009

(30) Foreign Application Priority Data

May 26, 2008    (CN) .......................... 2008 1 0301773

(51) Int. Cl.
*G02B 7/02* (2006.01)
(52) U.S. Cl. ................... 359/819; 359/822; 359/823
(58) Field of Classification Search ................ 359/819, 359/822, 823, 824, 811, 813
See application file for complete search history.

(56) References Cited

U.S. PATENT DOCUMENTS

2010/0060774 A1 *    3/2010    Azuma et al. ............... 348/335

* cited by examiner

*Primary Examiner*—Timothy J Thompson
(74) *Attorney, Agent, or Firm*—Andrew C. Cheng

(57) ABSTRACT

A lens actuator includes a lens barrel for accommodating the lens, a coil wrapped around the lens barrel, a plurality of magnets, a bracket for mounting the magnets thereon and accommodating the lens barrel therein, and a resilient plate connected between the bracket and the lens barrel to hold the lens barrel on the bracket. A cutout is defined in the edge of the through hole of the plate shaped body corresponding to the respective fixing portions. The lens barrel includes a plurality of fasteners. Each of the fastener includes a shaft extending through the cutouts and protruded out from the lens barrel and a head extending radially outwardly of the shaft at the distal end thereof. The resilient plate and the lens barrel are gripped together by engagement of the cutouts with the respective fasteners.

7 Claims, 5 Drawing Sheets

LENS ACTUATOR

CROSS REFERENCE TO RELATED APPLICATION

This application is related to a commonly-assigned copending application Ser. No. 12/192,376, entitled "resilient plate and lens actuator with same". Disclosures of the above-identified application are incorporated herein by reference.

BACKGROUND

1. Technical Field

The present invention relates to lens actuators, and particularly, to a voice coil motor type lens actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, what is needed is a lens actuator adapted for driving the lenses with more compact structure and less mechanical movement.

SUMMARY

A lens actuator includes a lens barrel for accommodating the lens, a coil wrapped around the lens barrel, a plurality of magnets, a bracket for mounting the magnets thereon and accommodating the lens barrel therein, and a resilient plate connected between the bracket and the lens barrel to hold the lens barrel on the bracket. The resilient plate includes a plate shaped body. A through hole is defined in the center of the plate shaped body. A plurality of slots is defined in the plate shaped body and the slots cooperatively surrounding the through hole. Each of the slots includes a first substantially straight slot portion, a second substantially straight slot portion and a third substantially straight slot portion. The second substantially straight slot portion interconnects between and is substantially perpendicular to the first and second substantially straight slot portions. The slots are cooperated to form a square-shaped pattern framing a central axis of the plate shaped body. Each of the fixing portions is located between the through hole and the junction portion of the second and third substantially straight slot portions of the corresponding slot. A cutout is defined in the edge of the through hole of the plate shaped body corresponding to the respective fixing portions. The lens barrel includes a plurality of fasteners. Each of the fasteners includes a shaft extending through the cutouts and protruded out from the lens barrel and a head extending radially outwardly from the shaft at the distal end thereof. The resilient plate and the lens barrel are gripped together by engagement of the cutouts of the respective fasteners.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Figure 1:
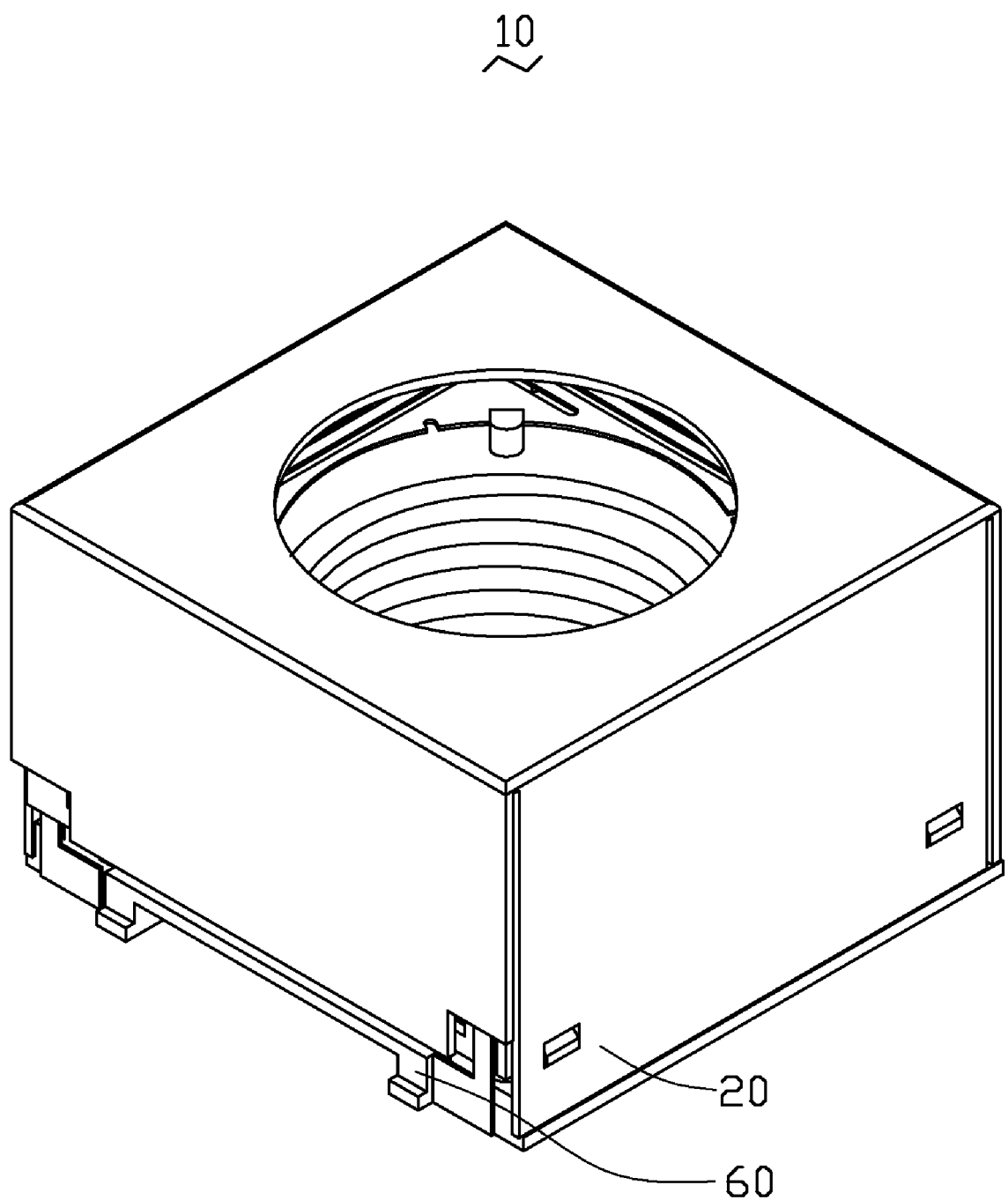
FIG. 1 is a schematic, isometric view of a lens actuator according to a present embodiment of the present invention, wherein the lens actuator includes a bracket, a movable unit, and a resilient plate.
Figure 2:
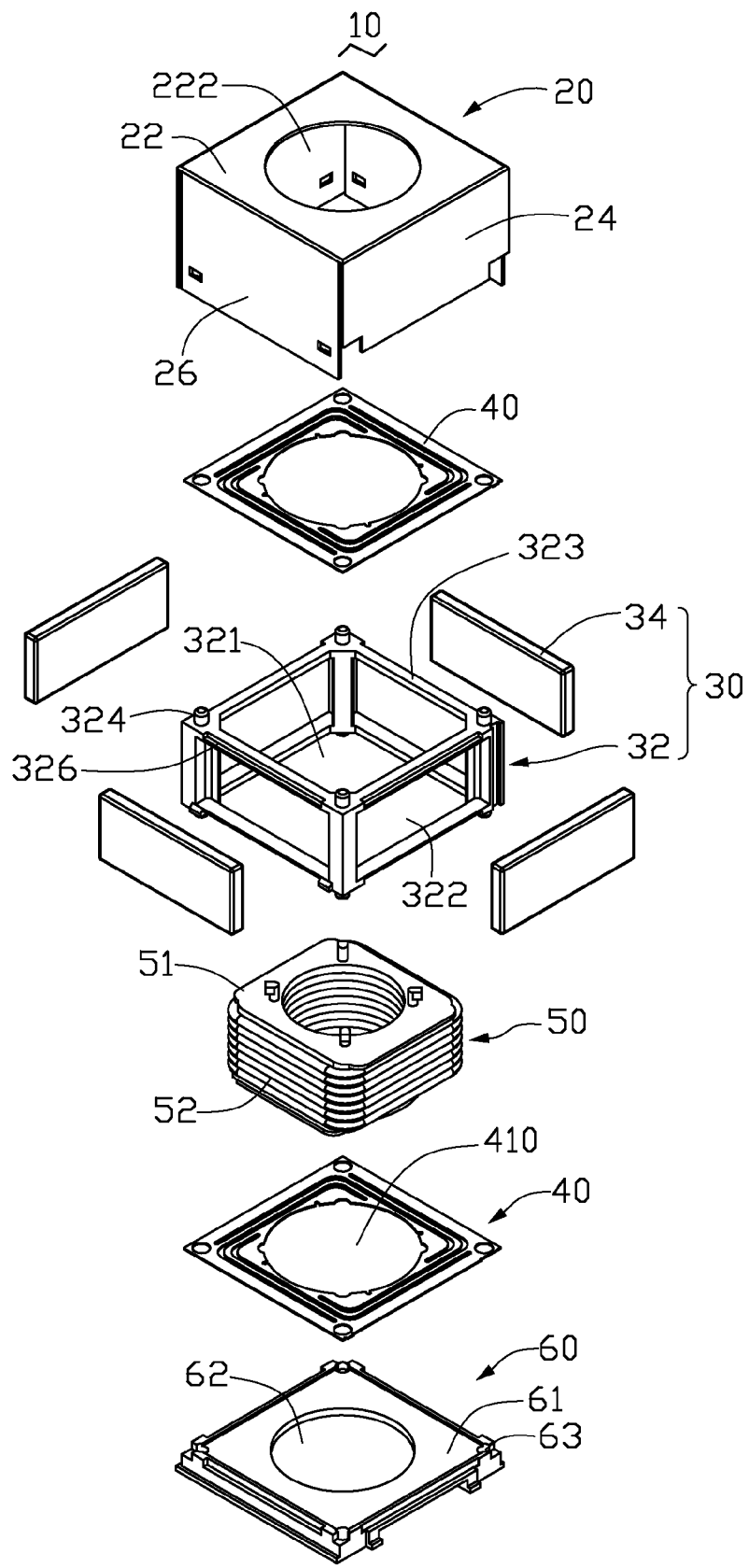
FIG. 2 is an exploded view of the lens actuator in FIG. 1.

Referring to FIGS. 1 and 2, a lens actuator 10, in accordance with a present embodiment, includes a housing 20, a fixed unit 30, a movable unit 50, two resilient plates 40, and a board 60.

The housing 20 includes a panel 22, a through hole 222 defined in the center of the panel 22, two opposite first peripheral panels 24 and two opposite second peripheral panels 26 respectively perpendicularly extending from four sides of the panel 22 and fastened to one another by use of dovetail panel joints (not shown). The panel 22, the first peripheral panels 24, and the second peripheral panels 26 cooperatively define a cavity for accommodating the fixed unit 30. The housing 20 is made of an electromagnetic shielding material, such as nickel alloy, conductive plastic, surface conductive material, conductive glass, etc.

The fixed unit 30 includes a cubic bracket 32 and a plurality of magnets 34. The bracket 32 includes a frame body 323 receivable in the housing 20. A first accommodation room 321 is defined in the frame body 323. Four magnet mounting holes 322 are respectively formed in four sides of the frame body 323. The magnet mounting holes 322 are in communication with the first accommodation room 321. A plurality of first gluing grooves 326 is defined in the frame body 323. The first gluing grooves 326 are configured for receiving adhesive for adhering the magnets 34 to the cubic bracket 32, and preventing or minimizing the amount of the adhesive infiltrating into the bracket 32. Four first locating pins 324 are respectively vertically protruded from the top and bottom sides of the frame body 323 at each corner thereof. The first locating pins 324 are configured for fastening the fixed unit 30 to one of the resilient plates 40. The number of the magnets 34 corresponds to that of the magnet mounting holes 322. The magnets 34 are respectively mounted in the magnet mounting holes 322.

Figure 3:
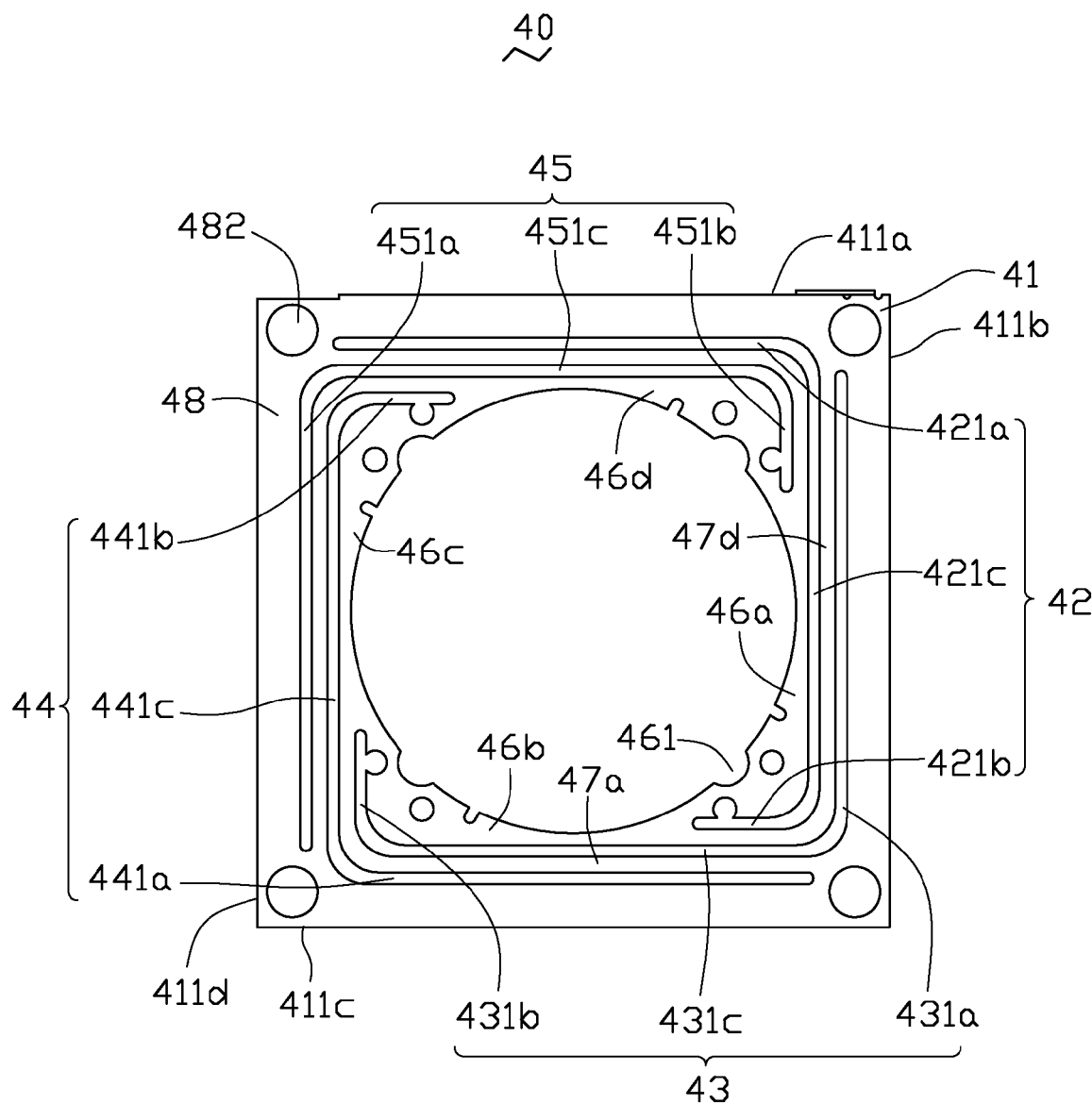
FIG. 3 is a schematic, isometric view of the bracket in FIG. 2.

Referring to FIG. 3, the resilient plate 40 comprises a plate shaped body 41. In the present embodiment, the plate shaped body 41 is square shaped. The plate shaped body 41 includes a first edge 411a, a second edge 411b, a third edge 411c, and a fourth edge 411d. The first edge 411a is parallel to the third edge 411c, and the second edge 411b is parallel to the fourth edge 411d. A second through hole 410 for light passing therethrough is defined at the center of the plate shaped body 41. A first slot 42, a second slot 43, a third slot 44 and a fourth slot 45 are defined in the plate shaped body 41 around the second through hole 410. Each slots (42, 43, 44, 45) is oriented at approximately right angles to adjacent slots.

The first slot 42 includes a first starting portion 421a, a first ending portion 421b, and a first connecting portion 421c. The first starting portion 421a is parallel to the first edge 411a. The first ending portion 421b is parallel to the third edge 411c. The first connecting portion 421c is parallel to the second edge 411b and connected with the first starting portion 421a and the first ending portion 421b. The length of the first ending portion 421b is less than or equal to that of the first starting portion 421a. A first fixing portion 46a is formed between the second through hole 410 and the angular part or space between the first ending portion 421b and the first connecting portion 421c.

The second slot 43 includes a second starting portion 431a, a second ending portion 431b, and a second connecting portion 431c. The second starting portion 431a is parallel to the second edge 411b. The second ending portion 431b is parallel to the fourth edge 411d. The second connecting portion 431c is parallel to the third edge 411c and connected with the second starting portion 431a and the second ending portion 431b. The length of the second ending portion 431b is less than or equal to that of the second starting portion 431a. A second fixing portion 46b is formed between the second through hole 410 and the angular part or space between the second ending portion 431b and the second connecting portion 431c. The second starting portion 431a and the second connecting portion 431c are on the outer side of the first slot 42, i.e., the second starting portion 431a and the second connecting portion 431c are closer to the second edge 411b and the third edge 411c than the first slot 42. A first L-shaped resilient portion 47a is arranged between the first slot 42 and the second slot 43. The resilient portion 47a has a uniform width throughout the length thereof. Since the L-shaped resilient portion 47a has an angular part or space, the durability and flexibility of the resilient plate 40 is enhanced.

The third slot 44 includes a third starting portion 441a, a third ending portion 441b, and a third connecting portion 441c. The third starting portion 441a is parallel to the third edge 411c. The third ending portion 441b is parallel to the first edge 411a. The third connecting portion 441c is parallel to the fourth edge 411d and connected with the third starting portion 441a and the third ending portion 441b. The length of the third ending portion 441b is less than or equal to that of the third starting portion 441a. A third fixing portion 46c is formed between the second through hole 410 and the angular part or space between the third ending portion 441b and the third connecting portion 441c. The third starting portion 441a and the third connecting portion 441c are on the outer side of the second slot 43, i.e., the third starting portion 441a and the third connecting portion 441c are closer to the third edge 411c and the fourth edge 411d than the second slot 43. A second L-shaped resilient portion 47b is formed between the second slot 43 and the third slot 44.

The fourth slot 45 includes a fourth starting portion 451a, a fourth ending portion 451b, and a fourth connecting portion 451c. The fourth starting portion 451a is parallel to the fourth edge 411d. The fourth ending portion 451b is parallel to the second edge 411b. The fourth connecting portion 451c is parallel to the first edge 411a and connected with the fourth starting portion 451a and the fourth ending portion 451b. The length of the fourth ending portion 451b is less than or equal to that of the fourth starting portion 451a. A fourth fixing portion 46d is formed between the second through hole 410 and the angular part or space between the fourth ending portion 451b and the fourth connecting portion 451c. The fourth starting portion 451a and the fourth connecting portion 451c are on the outer side of the third slot 44, i.e., the fourth starting portion 451a and the fourth connecting portion 451c are closer to the fourth edge 411d and the first edge 411a than the third slot 44. A third L-shaped resilient portion 47c is formed between the third slot 44 and the fourth slot 45. The first starting portion 421a and the first connecting portion 421c are on the outer side of the fourth slot 45, i.e., the first starting portion 421a and the first connecting portion 421c are closer to the fourth edge 411d and the first edge 411a than the fourth slot 45. A fourth L-shaped resilient portion 47d is formed between the fourth slot 45 and the first slot 42.

Each fixing portion (46a, 46b, 46c, 46d) defines a cutout 461 in the edge of the second through hole 410 respectively corresponding to the fixing portions (46a, 46b, 46c, 46d).

A periphery portion 48 is formed between the edges (411a, 411b, 411c and 411d) and the starting portions (421a, 431a, 441a and 451a). Four holes 482 corresponding to the first locating pins 324 are respectively defined in four corners of the periphery portion 48. The resilient plate 40 is fastened to the bottom side of the bracket 32 by engagement of the holes 482 with the respective first locating pins 324.

Figure 4:
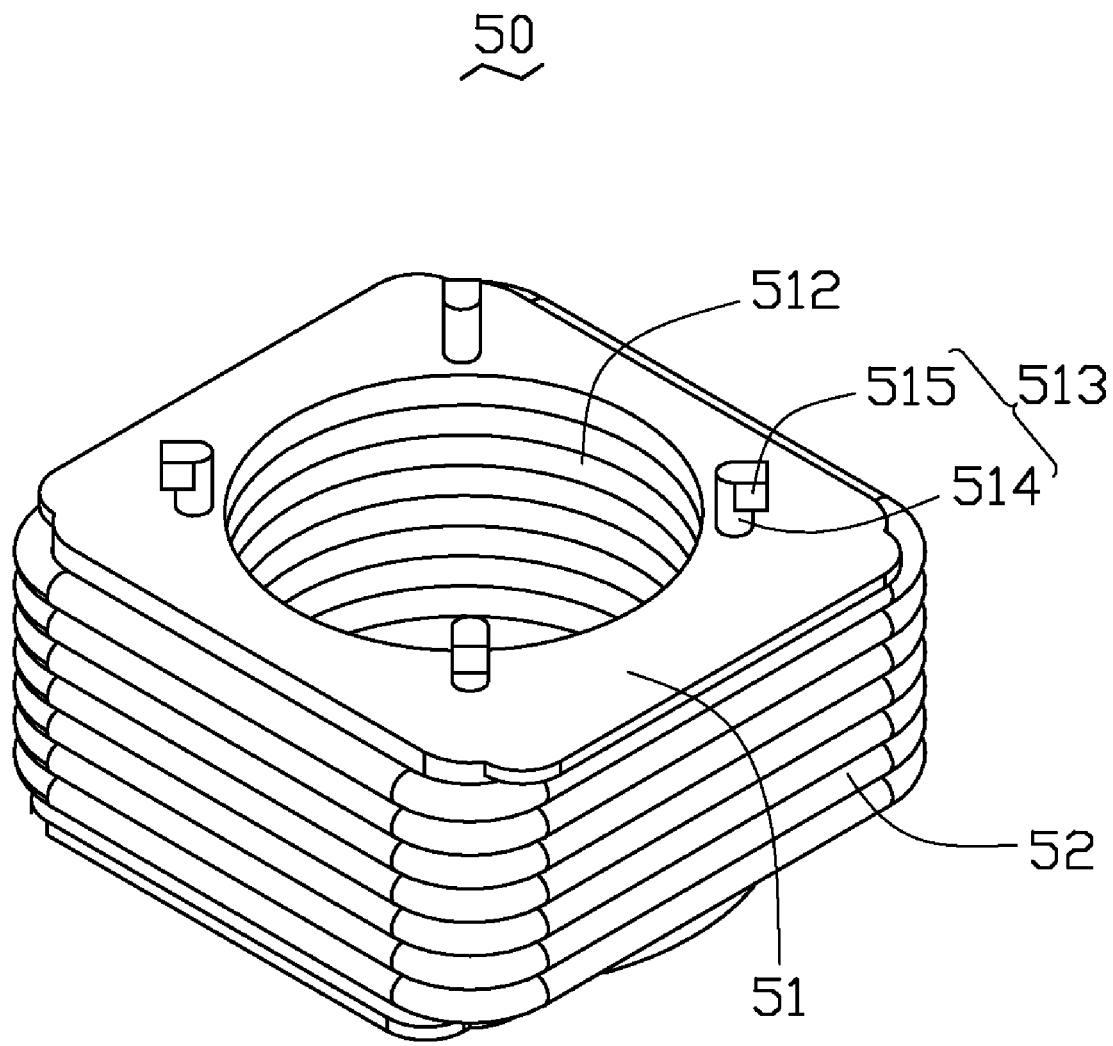
FIG. 4 is a schematic, isometric view of the movable unit in FIG. 2.
Figure 5:
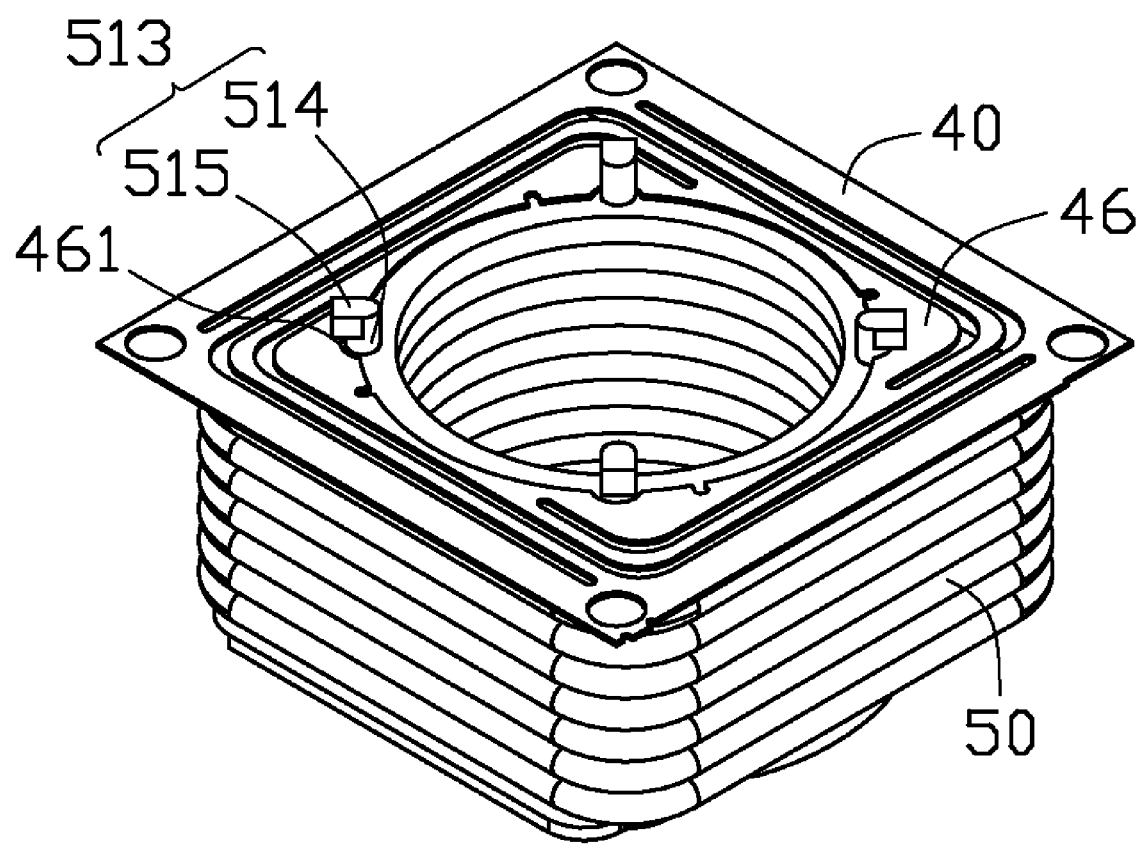
FIG. 5 is a schematic, isometric view of the resilient plate in FIG. 2.

Referring to FIG. 4, the movable unit 50 includes a lens barrel 51 and coils 52. The movable unit 50 is accommodated in the first accommodating room 321 of the bracket 32. The lens barrel 51 defines a second accommodating room 512 for accommodating the lenses and filters (not shown). The second accommodating room 512 is a through hole. Four fasteners 513 are respectively protruded out from the top and bottom sides of the lens barrel 51 corresponding to the cutouts 461. The fasteners 513 are configured for gripping or holding the resilient plate 40 and the lens barrel 51 together. Each of the fasteners 513 consists of a substantially cylindrical shaft 514 with one end attached to one of the top or bottom sides of the lens barrel 51 and a head 515 extending radially outwardly from the cylindrical shaft at the other end thereof, so as to prevent the resilient plate 40 from falling off the lens barrel 51. The cross section of the head 515 can be in other shapes such as rectangle, square, triangle, circle etc. The coils 52 are wrapped around the side wall of the lens barrel 51.

The board 60 comprises a body 61 covered over one of the resilient plates 40 on the top side of the housing 30, a through hole 62 corresponding to the second accommodating room 512 of the lens barrel 51, four holes 63 respectively fastened to the first locating pins 324 at the top side of the bracket 32.

When an electric current is applied to the coils 52, the coils 52 are excited to act upon the magnets 34, thereby producing a magnetic force to drive the lens barrel 42 to move between the resilient plates 40.

When electric current is cut off, the resilient plates 40 impart a pressure to the lens barrel 51 relative to the bracket 32, thereby returning the lens barrel 51 to its former position.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens actuator, comprising:
   a lens barrel for accommodating the lens, a coil wrapped around the lens barrel, a plurality of magnets, a bracket for mounting the magnets thereon and accommodating the lens barrel therein, and a resilient plate connected between the bracket and the lens barrel to hold the lens barrel on the bracket,
   wherein the resilient plate comprises a plate shaped body including
   a through hole defined in the center of the plate shaped body, a plurality of slots defined in the plate shaped body and the slots cooperatively surrounding the through hole, a plurality of fixing portions, wherein each of the slots includes a first substantially straight slot portion, a second substantially straight slot portion and a third substantially straight slot portion, the second substantially straight slot portion interconnects between and substantially perpendicular to the first and second substantially straight slot portions, the slots cooperate to form a square-shaped pattern framing a central axis of the resilient plate, each of the fixing portions is located between the through hole and the junction portion of the second and third substantially straight slot portions of the corresponding slot, and a cutout defined in the edge of the through hole of the plate shaped body corresponding to the respective fixing portions, wherein the lens barrel comprises a plurality of fasteners, each of the fastener comprises a shaft protruded out from the lens barrel and extending through the corresponding cutout and a head extending radially outwardly of the shaft at the distal end thereof, and the resilient plate and the lens barrel are assembled together by engagement of the cutouts with the respective fasteners.

2. The lens actuator as claimed in claim 1, wherein the plate shaped body is substantially a square plate.

3. The lens actuator as claimed in claim 2, wherein the plate shaped body includes a first edge, a second edge, a third edge, and a fourth edge, the first edge is substantially parallel to the third edge, and the second edge is substantially parallel to the fourth edge.

4. The lens actuator as claimed in claim 3, wherein the plate shaped body includes a plurality of L-shaped resilient portions, each L-shaped resilient portion arranged between two neighboring slots, each L-shaped resilient portion having a uniform width throughout the length thereof.

5. The lens actuator as claimed in claim 4, wherein a length of the third substantially straight slot portion of each slot is less than or equal to a length of the first substantially straight slot portion.

6. The lens actuator as claimed in claim 4, wherein the plurality of the slots comprises a first slot, a second slot, a third slot, and a fourth slot, the first substantially straight portion of the first slot is substantially parallel to the first edge, the second substantially straight portion of the first slot is substantially parallel to the second edge, the first substantially straight portion of the second slot is substantially parallel to the second edge, the second substantially straight portion of the second slot is substantially parallel to the third edge, the first substantially straight portion of the third slot is substantially parallel to the third edge, the second substantially straight portion of the third slot is substantially parallel to the fourth edge, and the first substantially straight portion of the fourth slot is substantially parallel to the fourth edge, the second substantially straight portion of the third slot is substantially parallel to the first edge.

7. The lens actuator as claimed in claim 1, wherein the bracket comprises a hollow frame body and a plurality of magnet mounting holes respectively defined in each side of the frame body, the magnet mounting holes being configured for mounting the magnets therein.

* * * * *